Aug. 3, 1965  P. KOLLSMAN  3,198,725
ELECTRODIALYSIS APPARATUS
Original Filed Dec. 9, 1957  3 Sheets-Sheet 1

INVENTOR.
Paul Kollsman
BY Howard G. Russell
his ATTORNEY

Aug. 3, 1965 P. KOLLSMAN 3,198,725
ELECTRODIALYSIS APPARATUS
Original Filed Dec. 9, 1957 3 Sheets-Sheet 2

INVENTOR.
Paul Kollsman
BY Howard G. Russell
his ATTORNEY

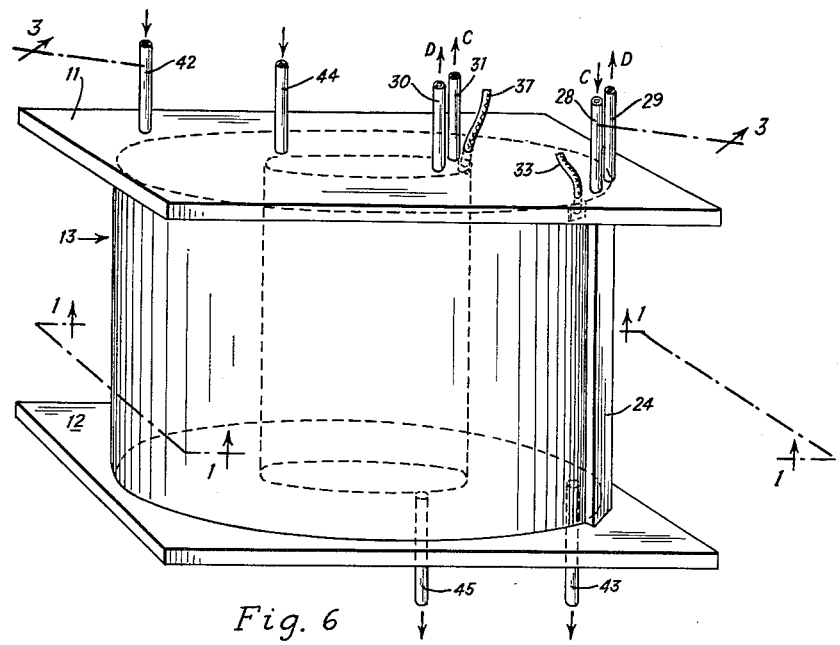
Fig. 6
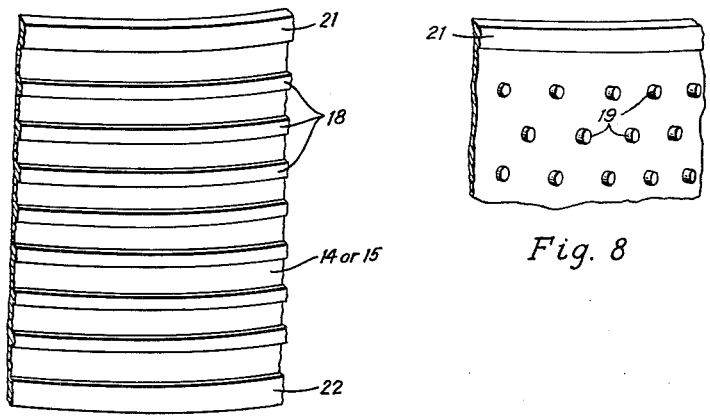
Fig. 7
Fig. 8
INVENTOR.
Paul Kollsman
BY Howard G. Russell
his ATTORNEY United States Patent Office 3,198,725
Patented Aug. 3, 1965

3,198,725
ELECTRODIALYSIS APPARATUS
Paul Kollsman, 100 E. 50th St., New York 22, N.Y.
Continuation of application Ser. No. 701,457, Dec. 9, 1957. This application May 18, 1961, Ser. No. 111,071
The portion of the term of the patent subsequent to July 15, 1974, has been dedicated to the Public
6 Claims. (Cl. 204—301)

This application is a continuation of my copending application Serial No. 701,457, filed December 9, 1957, abandoned after the filing of this application. Application Serial No. 701,457 is a continuation-in-part of my earlier application Serial No. 350,377, filed April 22, 1953.

This invention relates to apparatus for modifying the chemical composition of fluids by a controlled transfer of ions from, or into, selected fluid volumes under the influence of an electric current.

The transfer of ions takes place through semi-permeable walls separating a volume of fluid from which ions are to be withdrawn from the volume of fluid into which ions are to be transferred. The walls, also called membranes or diaphragms, are semi-permeable in the sense that they permit certain ions to pass therethrough without permitting an equivalent amount of fluid or solvent to pass.

In an electro-dialyzer at least certain of the walls, membranes or diaphragms are permselective in the sense that they are permeable to ions of one polarity while being passage-resistant to ions of the opposite polarity.

Numerous materials are known, and are commercially available, which can be shaped into thin walls and arranged in such a way that layers of fluid and membranes alternate, the arrangement being that the electric current traverses a plurality of membranes and fluid layers between the electrodes.

In Helvitica Chimica Acta, vol. 23 (1940), pages 795 to 800, Meyer and Straus disclose a method of preparing anion permeable and cation permeable membranes from Naturin, a treated collagen sheet material, and from treated cellophane, respectively. The manufacture of Naturin is disclosed in United States Patent 2,114,220 to Freudenberg and Becker.

In 1950 Wyllie and Patnode described in considerable detail the preparation and properties of improved membranes. In the Journal of Physical and Colloid Chemistry, vol. 54 (1950), pages 204 to 226, a method is disclosed which involves the embedding of suitably ground ion exchange resins into a plastic matric by compression at an elevated temperature. These membranes which were originally developed for the determination of dialysis potentials are suited for ion transfer by electrodialysis.

Anion resins and cation resins suitable for the preparation of membranes are available under a variety of trade names. The synthesis of such materials is described by Kunin and Myers in "Ion Exchange Resins," Wylie and Sons, 1950, beginning with page 54, and by Nachod in "Ion Exchange," Academic Press, 1949, beginning with page 48. Both textbooks list commercially available ion exchange resins by their respective trade names, giving the names of their manufacturers and principal composition.

Electro-dialyzers of conventional construction generally comprise a stack of spaced, substantially parallel membranes. An electrode is at each end of the stack so that the electric current traverses the several membranes and the fluid layers between the membranes.

The efficiency and economy of operation of electro-dialyzers of conventional construction is impaired by the formation of polarization layers on the membrane surfaces. It is desirable to reduce or remove these polarization layers by an increase in the flow velocity of the fluid. This remedy, however, is generally not available because the flow path in conventional electro-dialyzers is so short that a rapid flow of fluid is not exposed to the action of the electric current sufficiently long between the points of inflow and outflow to effect the desired transfer of ions.

These and various other aims, objects and advantages of the invention will appear more fully from the detailed description which follows, accompanied by drawings showing, for the purpose of illustration, preferred forms of the invention.

The invention also consists in certain new and original features of construction and combination of parts, as hereinafter set forth and claimed.

Although the characteristic features of this invention, which are believed to be novel, will be particularly pointed out in the claims appended hereto, the invention itself, its objects and advantages and the manner in which it may be carried out, will be better understood by referring to the following description taken in connection with the accompanying drawings, forming a part of it in which:

FIG. 6 is a perspective view of the complete apparatus;

FIG. 7 is a perspective view of a portion of a membrane employed in the apparatus of FIG. 5; and FIGS. 8 and 9 show modified forms of membrane for the apparatus.

Figure 1:
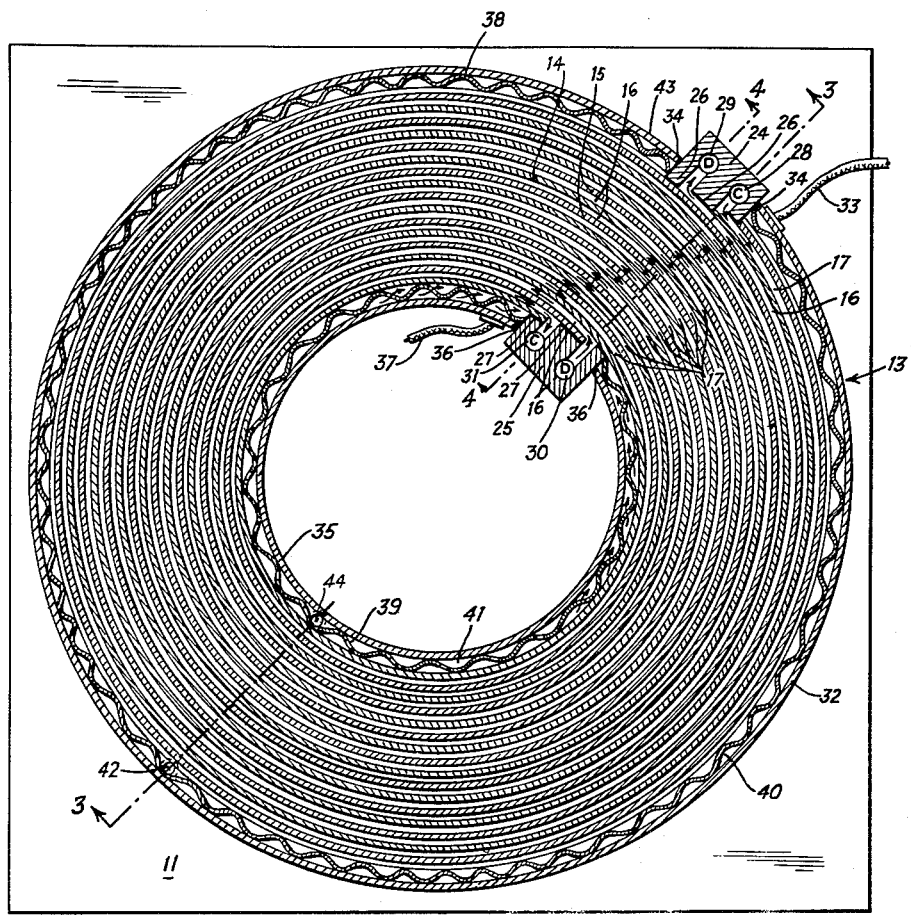
FIG. 1 is a horizontal cross-section through an apparatus embodying the invention, the section being taken in plane 1—1—1—1 of FIG. 6.
Figure 2:
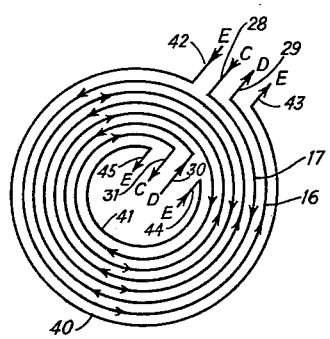
FIG. 2 is a diagrammatic representation of the flow paths of the apparatus of FIG. 1.

In the following description and in the claims, various details will be identified by specific names for convenience. The names, however, are intended to be as generic in their application as the art will permit. Like reference characters refer to like parts in the several figures of the drawings.

In the drawings accompanying and forming part of this specification, certain specific disclosure of the invention is made for the purpose of explanation of broader aspects of the invention, but it is understood that the details may be modified in various respects without departure from the principles of the invention, and that the invention may be incorporated in other structures than the ones shown.

The electro-dialyzer shown in the drawings comprises two end plates 11 and 12, between which the membrane assembly 13 is mounted.

The membrane assembly essentially consists of two substantially rectangular membrane strips 14 and 15 of a width substantially equal to the spacing of the plates 11 and 12 and of a length which is optional and depends entirely on the length of the flow path to be constructed.

One of the membranes is permeable to ions of one polarity and passage resistant to ions of the oppostie polarity, and the other membrane is permeable to ions of the opposite polarity and is suitably, although not necessarily, also passage resistant to ions of the one polarity.

As is apparent from the drawings, particularly FIG. 1, the first and the second membrane strips are spirally coiled upon each other in such a way as to leave fluid spaces 16 and 17 therebetween.

A first fluid space or passage 16 is formed between the membrane strip 14 and the membrane strip 15, and a second fluid space 17 is formed between the membrane strip 15 and the succeeding turn of the membrane strip 14.

In order to form these fluid spaces or passages, spacers are employed which separate the body of one membrane from the body of the next membrane. Such spacers may be separate elements, such as strips of membrane material, cellophane and the like, but are preferably protrusions integral with, and extending from, the body of the membranes.

As shown in FIG. 6, such protrusions may have the form of ribs 18, integrally formed as part of the membrane strip. FIG. 8 illustrates an alternate form of spacer in the form of substantially cylindrical studs 19.

Figure 9:
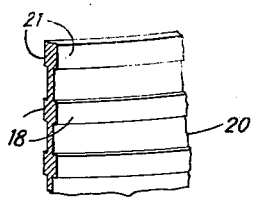
Figure 3:
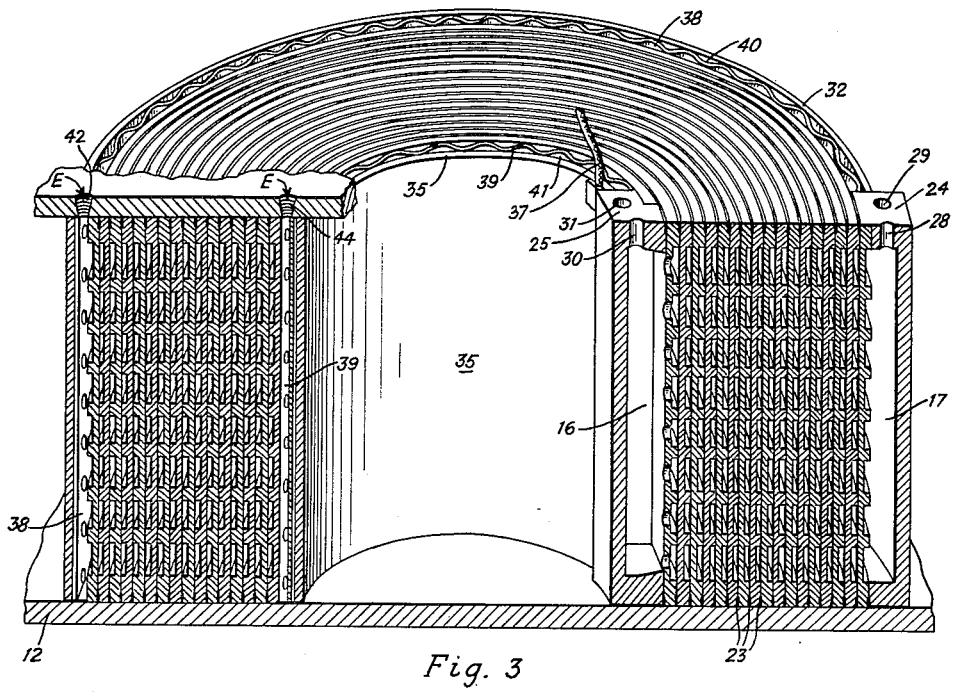
FIG. 3 is a vertical cross-section through the apparatus of FIG. 1, the section being taken on line 3—3.
Figure 4:
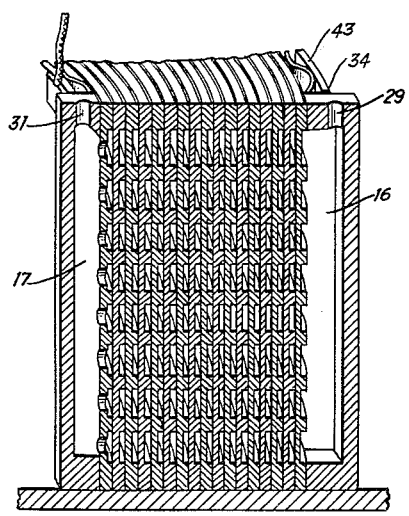
FIG. 4 is a vertical section through the apparatus of FIG. 1, the section being taken on line 4—4.
Figure 5:
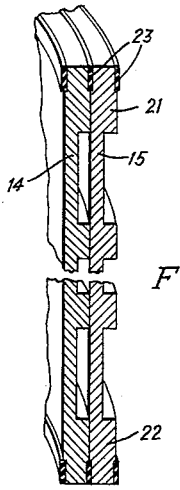
FIG. 5 is a perspective view of a preferred form of seal for the apparatus of FIG. 3.

In the forms of the apparatus shown in FIGS. 1 to 8 each membrane strip is provided with integral spacers, but it is, of course, possible to employ a double-faced membrane 20 as shown in FIG. 9 in connection with a flat sheet membrane.

Marginal sealing ribs 21 and 22 are provided for sealing the edges of the coiled membrane strips. These marginal sealing ribs are preferably made integral with the strip, like the spacer ribs, as shown in FIG. 6. Additional marginal seals of a suitable elastic sealing material may be employed as shown at 23 in FIG. 5.

Terminal blocks 24 and 25 are arranged at the ends of the membrane strips, and the membrane strips are sealed in regard to these blocks as shown at 26 and 27. Ducts 28 and 29 lead into the block 24 and ducts 30 and 31 lead into the block 25.

Fluid may be conducted through the apparatus in any desired direction. For example, the flows through the fluid passages 16 and 17 may be in the same direction or in opposite directions. In the illustrated form of apparatus flow in opposite directions is indicated.

Thus, fluid enters through duct 28 (see also FIG. 2) and flows through the passage 17 spirally towards the center, to leave the apparatus through the duct 31 at the end of the centermost turn of the fluid passage 17.

A further flow of fluid enters at 30 at the centermost turn of the fluid passage 16 and leaves the passage at the peripheral end through the duct 29.

The ducts 28, 29, 30 and 31 extend across the entire width of the membrane strips and constitute manifolds, in a sense, for the various branch passages formed by the spacer ribs 18. In the event spacer studs are employed, as shown in FIG. 8, there are of course no branch flows, but the fluid flows in the form of a ribbon, interrupted only by the studs which impart a certain amount of turbulence to the flow.

A peripheral electrode 32 has a lead 33 and is sealed with regard to the terminal block 24 at 34. A similar electrode 35 constitutes the center of the assembly and is sealed with respect to the terminal block 25 at 36. A lead 37 extends from the center electrode to a suitable source of electrical potential.

The peripheral electrode 32 and the central electrode 35 are spaced from the respective outermost and innermost turns of the membrane assembly by spacers 38 and 39, respectively. These spacers are preferably of corrugated material as shown particularly in FIG. 3. The electrode spacers form electrode chambers 40 and 41 through which fluid may flow between the electrode and the proximate turn of the membrane strip.

As shown best in FIG. 6, an inflow duct 42 is provided for the peripheral electrode chamber. This inflow duct extends through the end plate 11. A corresponding outflow duct 43 extends from the peripheral electrode chamber through the other end plate 12.

Similarly, a central inflow duct 44 for the electrode chamber 41 extends through the end plate 11 and a central outflow duct 45 leaves the electrode chamber 41 through the end plate 12.

The apparatus may be operated as follows:

It may be assumed that an ionic solution is to be deionized by transfer of ions into another fluid whose ionic concentration is correspondingly increased thereby. As a specific example, it may be assumed that sea water is to be desalted.

The solution to be deionized is preferably fed into the fluid passage 16. The fluid flows along a spiral path outwardly and finally leaves the apparatus through the duct 29. The fluid into which the ions are to be transferred is fed into the apparatus preferably through the duct 28, through which it enters into the fluid passage 17 to flow along a spiral path inwardly. As it does so, the ions of the fluid in passage 16 move through the bordering membrane walls into the adjoining passages 17 in such a way that the cations travel towards the cathode, which may be the electrode 32, the anions travelling towards the anode, which may be the electrode 35.

It is apparent from the dimensions of the apparatus that the current density is necessarily greater near the center of the apparatus than it is near the periphery. The fluid to be deionized is subjected to a powerful deionizing action immediately after entry into the apparatus. The fluid loses its ions rapidly, which are being transferred into the fluid flow within the fluid passage 17. The fluid entering this passage is preferably of a high degree of purity, so that fluid leakage through the membrane, which exists to some extent in all present commercial membranes, will not contaminate the fluid to be deionized. As the fluid within the passage 17 nears the center, it is being ion-enriched with progressive rapidity. It will be noted that the current density near the center is not only high because of the physical construction of the apparatus, but also because of the relatively high ionic concentration of the fluid in the passages adjacent the center.

Polarization layers are effectively removed, or at least reduced to an appreciable extent, by the rapid flow rate of the fluid which is preferably of the order of one to twenty inches per second. Since the flow paths are extremely long, for example of the order of 50 to 100 feet for an apparatus having an external diameter of approximately 12 to 20 inches and employing membranes of approximately 1 to 2 mm. thickness and 1 to 2 mm. spacing, the fluid may flow at a high velocity while yet remaining under the action of the electric current for a sufficient time before it leaves the apparatus. This velocity may be the greater the greater the number of turns through which the fluid flows. It is also evident that an addition of several turns lengthens the flow path appreciably, thus permitting a substantial increase in flow velocity, without materially increasing the diameter of the apparatus.

Large or small volumes of fluids are accommodated by an appropriate selection of the width of the membrane strips, that is, the spacing between the end plates 11 and 12.

An apparatus was constructed from two strips of Meyer and Straus membrane material of approximately 600 mm. length and 50 mm. width. The inner electrode had a diameter of 50 mm. around which the membrane strips were wound. The membrane strips were spaced by three strips of soft rubber sheet material of 2 mm. thickness and 5 mm. width which were wound up together with the membranes to form sealed spiral shaped chambers. The chambers were sealed along the margin by two of the rubber strips and the third rubber strip was used as a spacer along the center of the membrane. The electrode chambers were equipped with spacers of a thermoplastic screen material of 2 mm. thickness and 6 mm. mesh size. The membrane strip nearest the center electrode consisted of anion exchange material, the other membrane consisted of cation exchange material. The electrodes were shaped of sheet platinum and formed substantially complete rings. Each spiral chamber had an inner and an outer duct connection. Each electrode chamber also had an inlet and an outlet duct at each end. The central electrode was an anode and the outer electrode was a cathode.

Solution of 0.1% NaCl in water, acidified with hydrochloric acid to a pH of 4.5 was supplied into the concentration and dilution chambers and a current of 100 ma. was maintained. Saline solution was supplied into the pheripheral duct of the spiral chamber and concentrate was withdrawn adjacent the inner electrode. A second apparatus through the duct 30 through which it enters flow of saline solution was maintained through the deionization chamber, the supply point being adjacent the central electrode and the withdrawal point adjacent the peripheral electrode. The flow rate to each outflow duct was 5 cc. per minute. The flow rate through each electrode chamber was 20 cc. per minute.

After 60 minutes of operation the liquid withdrawn at the peripheral outflow duct had a concentration of 0.023% NaCl in water, corresponding to a reduction of the salt content by 77% during passage of the liquid through the spiral deionization chamber.

A second apparatus was constructed with membranes prepared according to the aforementioned disclosure of Wyllie and Patnode. The membranes were of a thickness of about 0.5 mm. Air dried Amberlite IRA–400 of 120 mesh size was used for the anion membranes and air dried Amberlite IR–120 of 120 mesh size was used for the cation membranes. The Amberlite constituted 70% of the total membrane material, the balance being polystyrene binder material. The membrane strips were approximately 600 mm. in length and 50 mm. in width. Three strips of soft rubber of 2 mm. thickness and 5 mm. width served as spacers and the construction of the apparatus corresponded to the apparatus previously described equipped with Meyer and Straus membranes.

Solution of 0.1% NaCl in water was fed into the apparatus without any addition of hydrochloric acid, and a current of 100 ma. was maintained. The operational data corresponded to those of the previous example.

After 60 minutes of operation the liquid withdrawn at the peripheral outflow had a concentration of 0.017% NaCl in water, corresponding to a reduction of the salt content by 83%.

In an apparatus embodying the invention, operated to pass the dilute flow through the apparatus in an outward direction, the current density is lowest across the portion of the dilute flow where the electrical resistance is the highest. The high flow velocity results in an effective reduction of polarization, particularly in the dilute portion where such reduction is most important.

What is claimed is:

1. In an electrodialysis apparatus comprising spaced electrodes, the combination, between the electrodes, of two spaced membranes of ion exchange material defining a liquid passage between them including a passage entrance and a passage exit for liquid passing through the passage; and a flow obstacle structure, said structure comprising a plurality of individual flow obstacle elements of ion exchange material extending from one membrane through said passage to the other membrane, said elements being laterally as well as longitudinally spaced from one another within said passage to obstruct liquid flowing through said passage and produce turbulence by the repeated dividing and recombining of the liquid flow at each individual element.

2. In an electrodialysis apparatus comprising spaced electrodes, the combination, between the electrodes, of two spaced membranes of ion exchange material defining a liquid passage between them including a passage entrance and a passage exit for liquid passing through the passage; and a flow obstacle structure, said structure comprising a plurality of individual flow obstacle elements of ion exchange material extending from one membrane through said passage to the other membrane, said elements being laterally as well as longitudinally spaced from one another within said passage and interconnected to maintain the spacing between the said elements, said elements obstructing the liquid flowing through said passage and producing turbulence by the repeated dividing and recombining of the liquid flow at each said element.

3. In an electrodialysis apparatus comprising spaced electrodes, the combination, between the electrodes, of two spaced membranes of ion exchange material defining a liquid passage between them including a passage entrance and a passage exit for liquid passing through the passage; and a flow obstacle structure of ion exchange material, said structure comprising a plurality of individual flow obstacle elements integral with at least one membrane and extending into the liquid passage into substantial contact with the other membrane, said elements being laterally as well as longitudinally spaced from one another within said passage to obstruct liquid flowing through said passage and produce turbulence by the repeated dividing and recombining of the liquid flow at each individual element.

4. In an electrodialysis apparatus comprising spaced electrodes, the combination, between the electrodes, of two spaced membranes of ion exchange material defining a liquid passage between them including a passage entrance and a passage exit for liquid passing through the passage; and a flow obstacle structure of ion exchange material, said structure comprising a plurality of individual flow obstacle elements of ion exchange material, said elements being integral with one membrane and extending through the liquid passage into contact with the other membrane, said elements being laterally as well as longitudinally spaced from one another within said passage to obstruct liquid flowing through said passage and produce turbulence by the repeated dividing and recombining of the liquid flow at each individual element.

5. A liquid turbulence promoting membrane spacing structure for electrodialysis cells, said structure comprising an assembly of individual elements of ion exchange material, said elements being laterally as well as longitudinally spaced from one another in the flow path to obstruct the liquid flow and produce turbulence by the repeated dividing and recombining of the flow at each individual element; and means for interconnecting said elements to maintain their spacing from one another, said elements having opposite end surfaces lying in two spaced substantially parallel planes.

6. A structure for the promotion of turbulence in a liquid flow channel of an electrodialysis cell, said structure comprising a plurality of individual elements of ion exchange material, said elements being laterally as well as longitudinally spaced from one another in the flow channel to obstruct the liquid flow and produce turbulence by the repeated dividing and recombining of the flow at each element; and a sheet of ion exchange material interconnecting said elements to fix the distance between said elements, said sheet forming one plane of the structure, the said elements having surfaces lying in a second plane spaced from, and substantially parallel to, said first plane.

References Cited by the Examiner

UNITED STATES PATENTS

| 2,741,595 | 4/56 | Juda | 204—260 |
| 2,799,644 | 7/57 | Kollsman | 204—301 |
| 2,802,344 | 8/57 | Witherell | 204—301 |
| 2,815,320 | 12/57 | Kollsman | 204—301 |
| 2,948,668 | 8/60 | De Whalley et al. | 204—301 |
| 3,014,855 | 12/61 | Kressman | 204—301 |

FOREIGN PATENTS

| 555,471 | 3/23 | France. |
| 652,442 | 4/51 | Great Britain. |

WINSTON A. DOUGLAS, *Primary Examiner.*

JOHN R. SPECK, JOHN H. MACK, *Examiners.*